June 9, 1964 R. E. SPENCER ETAL 3,136,986
CONVERTERS FOR CONVERTING DIGITAL INFORMATION INTO ANALOGUE INFORMATION
Filed Nov. 2, 1956 2 Sheets-Sheet 1

Inventors
R. E. Spencer
R. A. Cail
F. C. Wolfendale
By Glascock Downing & Seebold
Attys.

June 9, 1964 R. E. SPENCER ETAL 3,136,986

CONVERTERS FOR CONVERTING DIGITAL INFORMATION INTO ANALOGUE INFORMATION

Filed Nov. 2, 1956 2 Sheets-Sheet 2

Inventors
R. E. Spencer
R. A. Cail
F. C. Wolfendale
By Mascock Downing & Seebold
Attys.

United States Patent Office 3,136,986

Patented June 9, 1964

3,136,986

CONVERTERS FOR CONVERTING DIGITAL INFORMATION INTO ANALOGUE INFORMATION

Rolf Edmund Spencer, London, Roland Allan Cail, Slough, and Frederick Caleb Wolfendale, London, England, assignors to Electric & Musical Industries Limited, Hayes, England, a company of Great Britain

Filed Nov. 2, 1956, Ser. No. 620,145
Claims priority, application Great Britain Nov. 4, 1955
11 Claims. (Cl. 340—347)

This invention relates to converters for converting digital information into analogue information.

Many automatic control devices, for control of machine tools for example require input information for servo-mechanisms and such like in electrical analogue form, this input information being derived from a record of such information. However, from the point of view of accuracy in recording it may be preferable to record information in a digital manner so that a means for converting signals of digital form derived from such a record into analogue form is necessarily required. Moreover, it is often convenient to use a binary decimal code for the purpose of recording the input information. Evidently, accuracy achieved by recording information in digital manner must not be lost on converting to analogue form.

The object of the present invention is to provide an improved means for converting digital information into analogue information with a view to obtaining accurate conversion, which means is especially, but not exclusively, applicable where the digital information is in a binary decimal code form.

According to the present invention there is provided a converter for converting digital information into analogue potentials comprising means for selecting alternating potentials representative of individual digits or groups of digits, means for scaling said potentials to a level appropriate to their respective digital places, and means for adding said scaled potentials.

In a preferred embodiment of the invention the scaling means is included in the adding means and operates sequentially from digital place to digital place.

In order that the present invention may be clearly understood and readily carried into effect, the same will be described with reference to the FIGURES 1 and 2 of the accompanying drawings, which illustrate one example of the invention.

Figure 1:
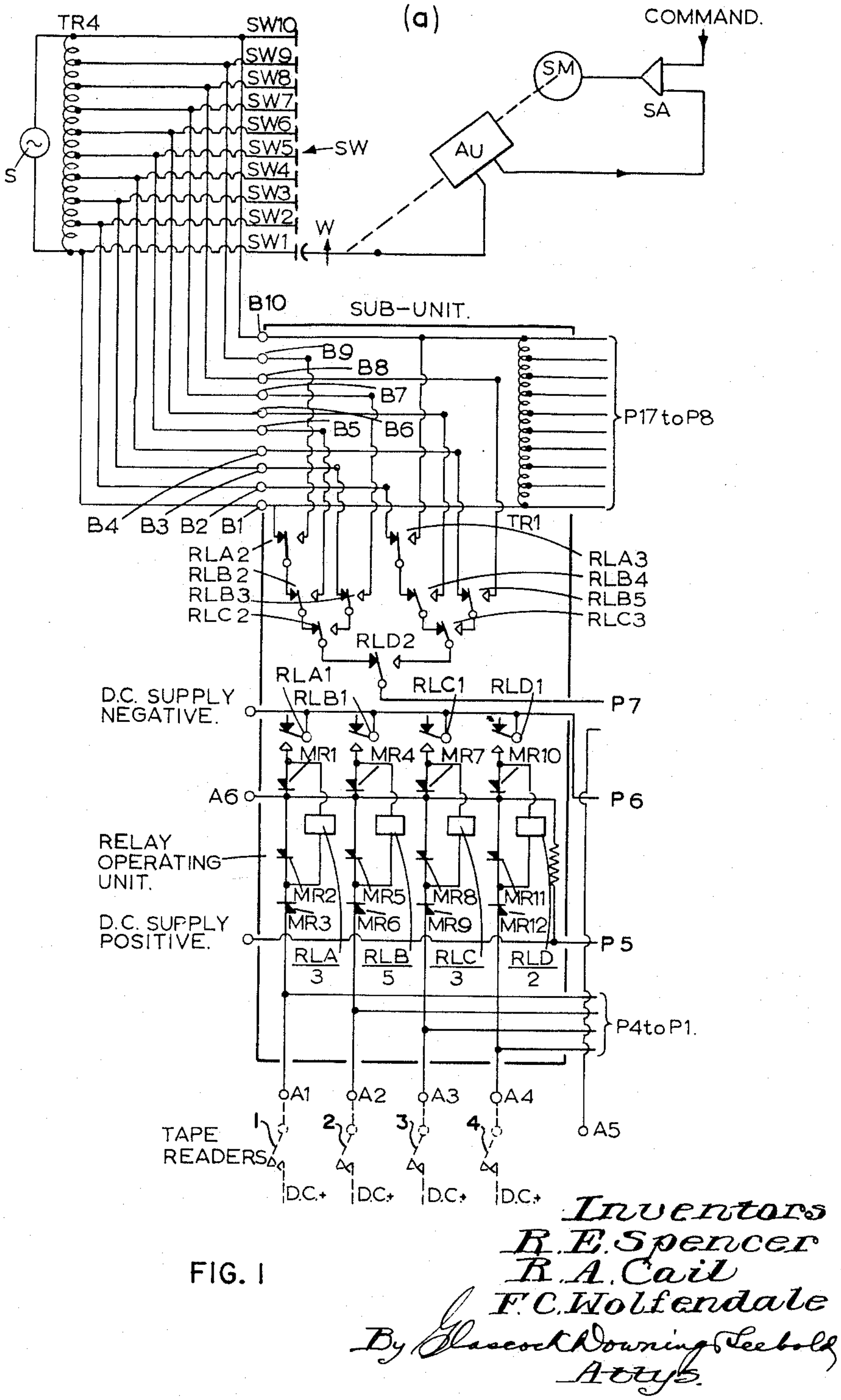

Referring to FIGURE 1, input information is derived from punched tape by a tape reader having four contacts 1, 2, 3 and 4, for simultaneously sensing the corresponding positions in four parallel tracks on the tape. Only four tracks are required to define a succession of decimal digits in binary form, but the tape may comprise further tracks for instructions relating to apparatus associated with the converter to be described. In the following description a binary digit "1" is represented on the tape by a hole.

Figure 2:
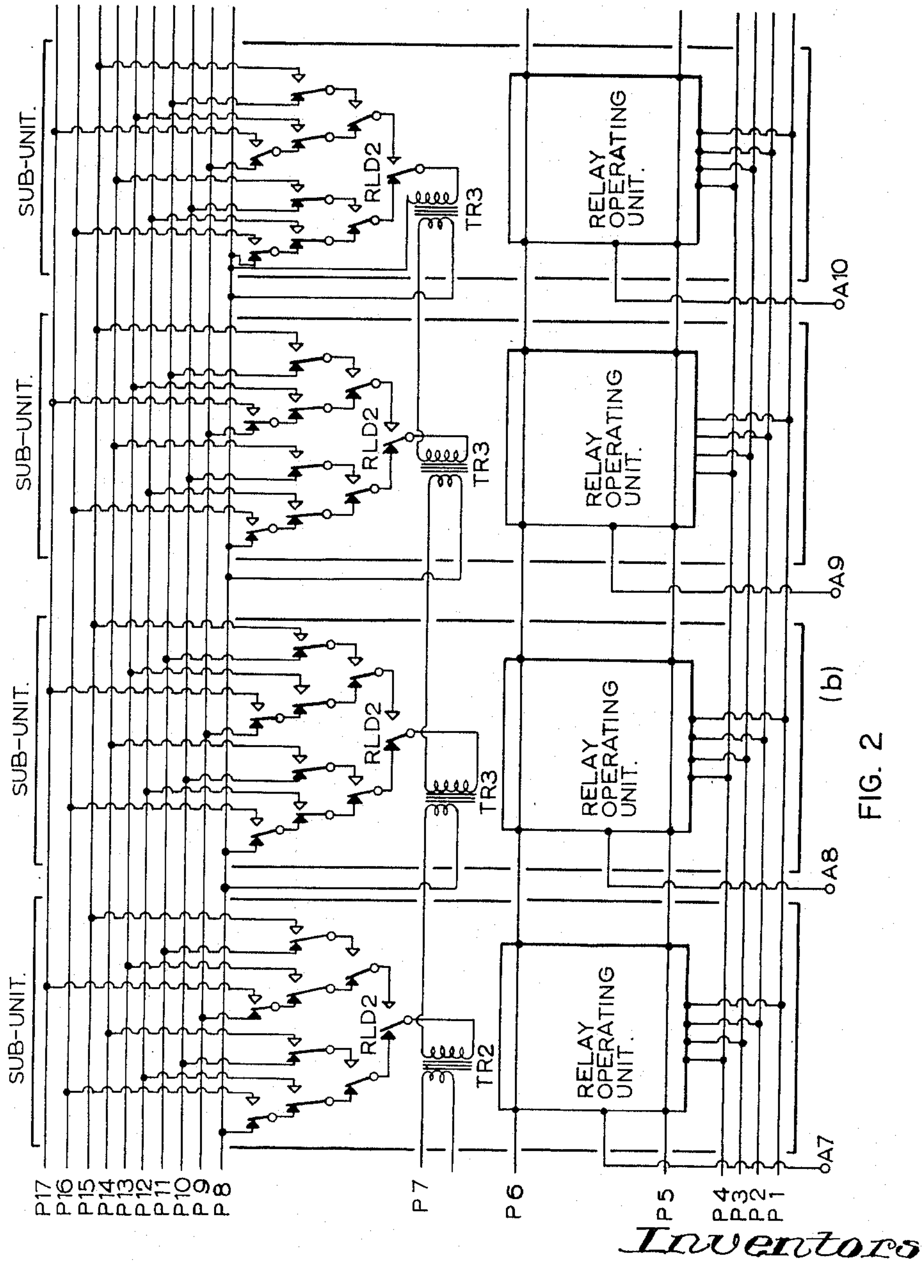

The tape reader contacts 1, 2, 3 and 4 are connected via input terminals A1, A2, A3 and A4 and the lines P1, P2, P3 and P4, respectively, to each of five relay operating units one of which is shown in FIGURE 1 and four of which are shown in FIGURE 2. These relay units are of similar construction and operation so that only the one in FIGURE 1, which is directly connected to the contacts 1, 2, 3 and 4 is shown in detail, the remaining four which are connected to the contacts 1, 2, 3 and 4 by the lines P1, P2, P3 and P4 being shown in block form in FIGURE 2.

The relays and associated circuits of each relay operating unit are constructed as shown, and a full description of such circuits may be found in U.S. co-pending patent application Serial Numbers 459,794 and 518,912, now U.S. Patent Nos. 2,949,600 and 2,887,638, respectively. Relays are denoted by RLA, RLB, RLC, and RLD, the switches of these relays being differentiated, for example, as RLA1, RLA2, and so on. The references MR1 to MR12 denote metal rectifiers.

In describing the operation of the relay circuits it will be assumed in FIGURE 1 that the tape reader 4 senses a hole representing a "1" and so transmits a positive digital pulse to the terminal A4 from the positive D.C. supply. Simultaneous with this sensing operation a similar conditioning pulse but of negative polarity is transmitted from the terminal A6, normally connected to the positive D.C. supply, so that a current flows via metal rectifiers MR12 and MR10 thereby energising the relay RLD. The conditioning pulse may be generated by means of a stepping switch which is advanced by one step on each occasion when the reader senses a row of holes on the tape. At predetermined positions the stepping switch connects the terminal A6 to ground. The stepping switch may be arranged to apply conditioning pulses also to the conditioning terminals A7, A8, A9 and A10 in the other relay units, the conditioning pulses being applied in a cyclic order to the respective terminals. Energisation of the relay RLD causes the switch RLD1 to change position so that when the sensing operation of the tape reader 4 is completed and the terminal A6 reverts to D.C. positive potential whilst the tape reader contacts 4 are open circuited, the energisation of the relay RLD continues by conduction from A6 via metal rectifier MR11 and switch RLD1 to the negative D.C. supply. The metal rectifiers MR12 and MR10 cease conducting when the sensing operation is completed.

If during the following sensing operation of this relay unit an "0" is sensed by the tape reader contacts 4 then no positive digital pulse is applied to the terminal A4. However, a negative conditioning pulse is applied to the terminal A6 which is effective in de-energising the relay RLD by stopping the conduction of metal rectifier MR11.

Thus any binary number presented to the tape readers 1, 2, 3 and 4 simultaneous with a conditioning pulse at A6 will cause a corresponding representative state of the relays RLA, RLB, RLC and RLD and a resultant state of the dependent relay switches which is unique for each binary coded decimal digit.

The contacts of the relay switches are connected as shown in FIGURE 1 to ten bus-bars B1 to B10, which are connected to tapping points of an auto-transformer TR4 so as to be maintained at alternating potentials of like phase. This auto-transformer TR4 is energised by a reference source of alternating potential S and the tapping points of the auto-transformer are such that there are equal potential differences between succeeding bus-bars B1 to B10, in that order. The connections of the relay switch contacts to the bus-bars are such that the sensing of a binary representation of a decimal digit on a tape causes energisation of the relays to connect the movable contact of the switch RLD2 to an alternating potential analagous to the decimal digit via other movable contacts and the appropriate bus-bar. Thus, for example, on sensing the binary number 0101 equivalent to the decimal digit five, relays RLB and RLD are energised so that the bus-bar B6 is connected via movable contact RLB4, RLC3, RLD2 and the secondary winding of transformer TR2 in FIGURE 2 (described hereinafter) to output terminal A5.

A further auto-transformer TR1 is connected at either end to the source S and has eight intermediate tapping points so that then bus-bars P8 to P17 may be connected to the auto-transformer TR1 in the same way as $B_1$ to $B_{10}$ are connected to TR4. The transformer $TR_1$ is provided to prevent excessive loading of the main transformer $TR_4$. The remaining four relay operating units which are represented in FIGURE 2 are of the same construction as that described above and receive conditioning pulses sequentially at terminals A7, A8, A9 and A10 after a sensing operation in the latter relay unit. It will be appreciated moreover that the parts of the apparatus shown in FIGURE 1 and FIGURE 2 are intended to be connected at the corresponding points marked P4 to P1, P5, P6 and P7. The five relay units have common positive and negative D.C. supplies, as shown, along lines P5 and P6 respectively. The operation of the remaining four relay units is the same as that described above in so far as each of those four units causes the selection of a potential from the bars P8 to P17 analogous to the binary coded decimal digit sensed by that unit. However, the output of the right hand unit is fed from its contact RLD2 to the primary winding of a transformer TR3, the secondary winding of which is in series with the primary winding of a similar transformer TR3 associated with adjacent relay unit. The secondary winding of the further transformer TR3 is connected in series with the primary winding of a third transformer TR3 associated with the centre relay unit, the secondary winding of which third transformer TR3 is connected in series with the primary winding of a similar transformer TR2 associated with the last of the remaining four relay units and mentioned above. Each of the three transformers TR3 and the transformer TR2 has an amplitude reduction ratio of 10 to 1 and are all alike except that one end of the secondary winding of TR2 is connected to the output terminal A5. Thus if five decimal digits in binary code form are sensed sequentially by the tape readers 1 to 4 to represent successive digits on a decimal scale whilst the corresponding conditioning pulses are applied sequentially to the terminals A6 to A10 then the five relay units cause a sequential selection of five potentials analogous to the five binary coded decimal digits. These alternating potentials are maintained until "cleared" by a sequence of five further sensing operations so that, from right to left, the fifth digit analogue potential is reduced in amplitude by a factor of ten and is added to the fourth digit analogue potential which potential sum is reduced in amplitude by a factor ten. This process is repeated again in the third transformer TR3 and again in the transformer TR2 where the second to fifth digit potential analogues, having been scaled down to a level appropriate to their respective decimal digital places and added together, are added finally to the potential analogue of the first digit in the secondary winding of the transformer TR2 which final sum is fed to the output terminal A5. Clearly, the signal at terminal A5 does not represent the final analogue signal until the last digit has been sensed and cannot be employed until such time.

This final output sum derived from A5 in FIGURE 1 may be employed to contribute to the command signal for a servo-mechanism SM, being in that case applied to an amplifier SA together with another signal of like phase but opposite polarity derived from an analogue unit. The servo-amplifier SA rectifies the input signals before or after adding them to obtain a direct current signal for driving a servo-mechanism SM which may be employed for positioning a component of a machine tool, for example. The analogue unit AU serves to derive a feedback signal as described representing the actual component position at any time.

The studs SW1 to SW10 of a switch SW may be connected to the bus bars B1 to B10, respectively, which switch comprises a brush or equivalent W driven by the servo-mechanism SM so as to derive the decimal digit of highest significance in the analogue unit signal.

The final analogue unit output signal may be generated by summing together the signal from the brush W and contributions representing the remaining decimal digits derived from separate cascaded switches or transformers, as described for example in United States co-pending patent application Serial Number 484,202, now Patent No. 3,100,864.

In the operation described above, an analogue signal may be derived representing a maximum number of 99999 (ignoring the possibility of a decimal point). If, however, the maximum number required at any point were 49999, say, then the range of the highest order digit is from 0 to 4. Thus potentials on bus-bars B1 to B9 may be regarded as representing digits from 0 to 4 and employed alternately, that is to say, a highest order digit of 3, for example, coded on the tape would cause the left hand relay unit to select a potential from bus-bar B6. This may be done by changing the connections from the appropriate relay switch contacts to different bus-bars as required. In the case just described the relay RLA and associated circuit may be dispensed with in the left hand relay unit. As a result of the highest order digit having a limited range the transformer TR2 would not have the same step down ratio as the three transformers TR3, and in the above case this ratio would be 5 to 1.

In an alternative arrangement of the converter the bus-bars B1 to B10 may be connected to the transformer TR1 of the specification of British Patent No. 847,367. In this case the transformer TR1 of the figure has to be energised from the reference source independently of the bus-bars B1 to B10.

In the application of the derived analogue signal from terminal A5 to contribute to a command signal for the control of a machine tool component, other signals may be derived from the tape and converted to analogue form in similar manner, the command signal being produced by interpolation among the discrete signals so derived. In this case the bus-bars B1 to B10 are common to all of the converters which may be employed and it is found that the expedient of using common bus-bars for the highest order digit of the machine tool component position analogue can increase the overall accuracy of the control system by a factor of ten.

A still greater accuracy can be obtained by increasing the number of bus-bars and so making the highest order digit in each case of greater significance.

The invention offers the important advantage that, due to the scaling down of the potential analogues of all but the highest order digit, inaccuracies caused by contact resistances are considerably less significant than they would be in the case of selecting analogue potentials at the correct levels whereby contact resistances in the selecting means are additive and thus cause serious inaccuracies.

A further advantage of the present invention when applied to automatic machine tools or the like lies in the possibility of deriving the highest order digit of the command signal and positional analogue feedback signal of a servo-mechanism from a common group of potential sources. Thus relative errors between the two digits of highest significance are reduced.

Although the apparatus has been described for converting binary decimal coded numbers into analogue signals it must be appreciated that any digital input signal may be converted into an analogue signal in accordance with the invention as described above and with the same advantages of high accuracy.

What we claim is:

1. An electrical signal converter comprising a source of alternating potentials and a transformer winding coupled to said source to cause an alternating potential to be produced across said transformer winding, a plurality of taps on said transformer winding being provided to form a group of potential sources which yield a series of potentials which differ one from the next by equal amounts, an output lead, a secondary winding of a further transformer having one end connected to said lead, first selector means for selectively connecting the other end of said secondary winding to one of said sources to select a first potential representing a number of desired value, a primary winding for said further transformer, means connecting one end of said primary winding to a point of substantially fixed potential, second selector means for connecting the other end of said primary winding to one of said group of sources to select a second potential representing another number of a desired value, said further transformer having a step down ratio related to the number of said sources thereby to form the sum of said first selected potential with another potential derived from stepping down the other selected potential in the ratio corresponding to the step down ratio from one number order to the next lower number order.

2. A converter according to claim 1 said means connecting one end of said primary winding to a point of substantial fixed potential comprising a secondary winding of a third transformer, and comprising a primary winding for said third transformer, a connection from one end of said third transformer primary winding to a point of substantially fixed potential, a third selector means for connecting the other end of said third transformer primary winding to one of said group of sources to select a third potential representing a third number of a desired value, said third transformer having a step down ratio related to the number of said sources thereby to increase said sum by a potential derived from said third selected potential by stepping down said third selected potential in the ratio corresponding to the step down from one number order to the second lower number order.

3. A converter according to claim 1 wherein each of said groups of potential sources contain 10 sources and each selector means comprises a group of input terminals for receiving signals representing the value of a decimal digit coded in binary pulse code, a group of relays one corresponding to each input terminal and responsive to received signals, a group of relay switches responsive to said relays to assume a combination of states corresponding to received signals, said switches being prearranged to connect said other end of the respective transformer primary winding to one of said sources in dependence upon received signals.

4. In combination with a converter according to claim 1, means for deriving a command signal in response to an analogue potential derived from said converter, a servo motor, a member displaceable by said servo motor, means for deriving an alternating feedback potential having an amplitude representing the displacement of said member, said last mentioned means including means for selecting as a major part of said feedback potential, a potential from one of said first groups of potential sources, and means for comparing said command signal and said feedback signal to derive an error signal, said servo motor being responsive to said error signal to displace said member in a sense tending to reduce said error signal.

5. An electrical signal converter comprising a source of alternating potentials and an auto-transformer having terminals connected to said source, a plurality of tappings on said auto-transformer being provided to form a group of potential sources which yield a series of potentials which differ one from the next by equal amounts, an output lead, a transformer having a secondary winding one end of which is connected to said output lead, first selector means for selectively connecting the other end of said secondary winding to one of said sources to select a first potential representing a number of desired value, a primary winding of said second transformer, means connecting one end of said primary winding to a point of substantially fixed potential, a second source of alternating potentials and a further auto-transformer having terminals connected to said second source, a plurality of tappings on said second auto-transformer being provided to form a further group of potential sources which yield a series of potentials which differ one from the next by equal amounts, second selector means for connecting the other end of said primary winding to one of said second group of sources to select a second potential representing another number of a desired value, said transformer having step-down ratio related to the number of said sources thereby to form the sum of said first selected potential with another potential derived from stepping down the other selected potential in the ratio corresponding to the step-down ratio from one number order to the next lower number order.

6. A converter according to claim 5 said means connecting one end of said primary winding to a point of substantial fixed potential comprising a secondary winding of a second transformer and comprising, a primary winding for said second transformer, means connecting one end of said second transformer primary winding to a point of substantially fixed potential, a third selector means for connecting the other end of said second transformer primary winding to one of said second group of sources to select a third potential representing a third number of a desired value, said second transformer having a step-down ratio related to the number of sources in said second group thereby to increase said sum by a potential derived from said third selected potential by stepping down said third selected potential in the ratio corresponding to the step-down ratio from one number order to the second lower number order.

7. A converter according to claim 6 said means connecting one end of said second transformer primary winding to a point of substantial fixed potential comprising the secondary winding of a third transformer, a primary winding for said third transformer, means connecting one end of said third transformer primary winding to a point of substantially fixed potential, a fourth selector means for connecting the other end of said third transformer primary winding to one of said secondary second group of sources to select a fourth potential representing a fourth number of a desired value, said third transformer having a step-down ratio related to the number of sources in said second group to increase said sum by a potential derived from said fourth selected potential by stepping down said fourth selected potential in the ratio corresponding to the step-down from one number order to the second lower number order.

8. A converter according to claim 5 said first source of alternating potentials and said second source of alternating potentials comprising the same source.

9. A converter according to claim 5 wherein each of said groups of potential sources contain 10 sources and each selector means comprises a group of input terminals for receiving signals representing the value of a decimal digit coded in binary pulse code, a group of relays one corresponding to each input terminal and responsive to received signals, a group of relay switches responsive to said relays to assume a combination of states corresponding to received signals, said switches being prearranged to connect said other end of the respective transformer primary winding to one of said sources in dependence upon received signals.

10. In combination with a converter according to claim 5, means for deriving a command signal in response to an analogue potential derived from said converter, a servo motor, a member displaceable by said servo motor, means for deriving an alternating feedback potential having an amplitude representing the displacement of said member, said last mentioned means including means for selecting as a major part of said feedback potential, a potential from one of said first groups of potential sources, and means for comparing said command signal and said feedback signal to derive an error signal, said servo motor being responsive to said error signal to displace said member in a sense tending to reduce said error signal.

11. An electrical signal converter comprising a source of alternating potentials, an auto-transformer having a plurality of taps and being connected to said source, a transformer having a primary winding and a secondary winding, first selector means for selectively connecting two taps of said auto-transformer to the ends of said primary winding to derive from between said taps a potential representing a number in a first number order, a pair of output terminals, one connected to one end of said secondary winding, and second selector means for selectively connecting two further taps of said auto-transformer respectively to the other output terminal and to the other end of said secondary winding, to derive between said further taps a potential representing a number in a second number order, said transformer having a step down ratio corresponding to the ratio of said second number order to said first number order and to cause the potential between said output terminals to represent the sum of said number in said first number order with the number in said second number order.

References Cited in the file of this patent

UNITED STATES PATENTS

| | | |
|---|---|---|
| 2,718,634 | Hansen | Sept. 20, 1955 |
| 2,738,504 | Gray | Mar. 13, 1956 |
| 2,775,754 | Sink | Dec. 25, 1956 |
| 2,803,815 | Wulfsburg | Aug. 20, 1957 |
| 2,849,668 | Tripp | Aug. 26, 1958 |
| 2,875,390 | Tripp | Feb. 24, 1959 |
| 2,876,950 | Daykin | Mar. 10, 1959 |